(12) United States Patent
Sawada

(10) Patent No.: US 7,934,768 B2
(45) Date of Patent: May 3, 2011

(54) BELT SUPPORTING APPARATUS FOR VEHICLE ROOF AND ROOF DEVICE FOR VEHICLE

(75) Inventor: Kazuki Sawada, Handa (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 12/546,263

(22) Filed: Aug. 24, 2009

(65) Prior Publication Data

US 2010/0045076 A1    Feb. 25, 2010

(30) Foreign Application Priority Data

Aug. 25, 2008   (JP) ................................. 2008-215560

(51) Int. Cl.
    *B60J 7/057*    (2006.01)
(52) U.S. Cl. ....................................................... 296/223
(58) Field of Classification Search ...... 296/216.01–224
    See application file for complete search history.

(56) References Cited

U.S. PATENT DOCUMENTS

| 6,786,540 | B2 * | 9/2004 | Friedrich et al. ............... 296/223 |
| 6,964,450 | B2 | 11/2005 | Nagashima et al. |
| 7,055,453 | B2 * | 6/2006 | Miotto et al. .................. 114/361 |
| 2009/0101291 | A1 * | 4/2009 | Kriese et al. .................. 160/310 |

FOREIGN PATENT DOCUMENTS

| JP | 8-11546 A | 1/1996 |
| JP | 2004-299477 A | 10/2004 |

* cited by examiner

*Primary Examiner* — Dennis H Pedder
(74) *Attorney, Agent, or Firm* — Buchanan Ingersoll & Rooney PC

(57) ABSTRACT

A belt supporting apparatus includes a bottom portion, first and second wall portions integrally formed with the bottom portion so as to be parallel to each other, a holding portion integrally formed at the second wall portion and an opening formed at the bottom portion opposes the holding portion, wherein the housing houses a toothed belt so as to be slidably in such a way that a toothed portion of the toothed belt is facing the first wall portion, and a back surface formed at the other surface of the toothed belt is facing the second wall portion, and the toothed belt is prevented from being moved out of the housing in the vehicle height direction by means of the holding portion.

14 Claims, 3 Drawing Sheets

21 Front housing (housing)
24 Toothed belt
26 Toothed portion
27 Back surface
31 Bottom portion
32 First wall portion
33 Second wall portion
35 Holding portion
36 Opening

BELT SUPPORTING APPARATUS FOR VEHICLE ROOF AND ROOF DEVICE FOR VEHICLE

CROSS REFERENCE TO RELATED APPLICATIONS

This application is based on and claims priority under 35 U.S.C. §119 to Japanese Patent Application 2008-215560, filed on Aug. 25, 2008, the entire content of which is incorporated herein by reference.

FIELD OF THE INVENTION

The present invention relates to a belt supporting apparatus for a vehicle roof and a roof device for vehicle.

BACKGROUND

A roof device for vehicle disclosed in JP2004299477A includes a movable panel to open or close an opening portion provided at a vehicle roof, two guide rails each of which are provided at a side in width direction of the opening portion and extending in longitudinal direction of the vehicle, operation mechanisms guided by the guide rail and supporting the movable panel. Further, a toothed belt is connected to each of the operation mechanism meshing with a driving gear rotated by a power source provided at a central portion of a front housing. The toothed belt, which is deformable in three-dimensional directions, is movably housed in a casing supported by the front housing. The casing is formed in a tubular shape having a rectangular cross section, which is formed so as to correspond to a shape of the toothed belt. In this configuration, when the toothed belt is moved by use of a drive of the driving gear in order to transmit the driving force to the operation mechanism, because the toothed belt is moved by forming a moving path with a guide by the casing, the toothed belt may not deflect to an unexpected level.

Thus, because the casing formed in the tubular shape having the rectangular cross section is formed independently from the front housing, the casing needs to be formed with a connecting portion at which the front housing or the guide rail is fixed. Accordingly, the number of the parts consisting the roof device is increased, and manufacturing hours may also be increased because of the fixing operation between the casing and the front housing and the like at the connecting portion. Further, because the casing is formed in the tubular shape having the rectangular cross section, the casing needs to be bent so as not to exceed a certain level in order to smoothly move the toothed belt, a level of flexibility of a setting of the moving path of the toothed belt may be decreased.

Furthermore, in consideration of a deformation of the casing in its longitudinal direction, the connecting portion of the casing may be formed in a sufficient length in order to compensate the deformation.

A need thus exists for a belt supporting apparatus for a vehicle roof and a roof device for a vehicle, which are not susceptible to the drawback mentioned above.

SUMMARY OF THE INVENTION

According to an aspect of the present invention, a belt supporting apparatus for a vehicle roof made of resin and formed so as to support a driving gear rotated by a power source and a toothed belt meshing with the driving gear and connected to an operation mechanism provided at each side of a vehicle roof in a vehicle width direction, comprises a housing, which includes a bottom portion, a first wall portion integrally formed with the bottom portion so as to stand from the bottom portion in a vehicle height direction, a second wall portion integrally formed with the bottom portion so as to stand from the bottom portion in the vehicle height direction and be parallel to the first wall portion, a holding portion integrally formed at the second wall portion so as to protrude toward the first wall portion in a length that is shorter than a distance between the first wall portion and the second wall portion and an opening formed at the bottom portion along the first and second wall portions and opposes the holding portion, so as to open in a height direction of the vehicle, wherein the housing houses the toothed belt so as to be slidably in such a way that a toothed portion of the toothed belt, formed at one surface of the toothed belt so as to extend in a moving direction thereof, is facing the first wall portion, and a back surface formed at the other surface of the toothed belt is facing the second wall portion, and the toothed belt is prevented from being moved out of the housing in the vehicle height direction by means of the holding portion.

According to an aspect of the present invention, a belt supporting apparatus for a vehicle roof made of resin and formed so as to support a driving gear rotated by a power source and a toothed belt meshing with the driving gear and connected to an operation mechanism provided at each side of a vehicle roof in a vehicle width direction, comprises a housing, which includes a bottom portion, a first wall portion integrally formed with the bottom portion so as to stand from the bottom portion in a vehicle height direction, a second wall portion integrally formed with the bottom portion so as to stand from the bottom portion in the vehicle height direction and be parallel to the first wall portion, the bottom portion and the first and second wall portions being formed in such a way that a cavity defined by a first mold and a second mold is filled with resin that is in a molten state, and a holding portion integrally formed at the second wall portion so as to protrude toward the first wall portion in a length that is shorter than a distance between the first wall portion and the second wall portion, wherein at a portion where the holding portion is not formed, the first wall portion, the second wall portion and one surface of the bottom portion facing the first and second wall portions are formed by use of the first mold, and the other surface of the bottom portion not facing the first and second wall portions is formed by use of the second mold, at a portion where the holding portion is formed, by a parting structure of the first and second molds, one surface of the second wall portion facing the first wall portion and one surface of the holding portion facing the bottom portion and connected to the one surface of the second wall portion are formed by use of the second mold, and one surface of the first wall portion facing the second wall portion and the other surface of the holding portion not facing the bottom portion are formed by use of the first mold, and the housing houses the toothed belt so as to be slidably in such a way that a toothed portion of the toothed belt, formed at one surface of the toothed belt so as to extend in a moving direction thereof, is facing the first wall portion, and a back surface formed at the other surface of the toothed belt is facing the second wall portion, and the toothed belt is prevented from being moved out of the housing in the vehicle height direction by means of the holding portion.

According to an aspect of the present invention, a roof device for a vehicle comprises a movable panel by which an opening portion of a roof of the vehicle is closed or exposed to the outside in accordance with the movement of the movable panel, two guide rails, one of the guide rails provided at one side of the opening portion in a vehicle width direction so as to extend in a front-rear direction of the vehicle, and the other of the guide rails provided at the other side of the opening portion in the vehicle width direction so as to extend in the front-rear direction of the vehicle, an operation mechanism guided by the guide rail and supporting the movable panel, a driving gear rotated by a power source, a toothed belt meshing with the driving gear and connected to an operation mechanism provided at each side of a vehicle roof in the vehicle width direction and a housing including a bottom portion, a first wall portion integrally formed with the bottom portion so as to stand from the bottom portion in a vehicle height direction, and a second wall portion integrally formed with the bottom portion so as to stand from the bottom portion in the vehicle height direction and be parallel to the first wall portion, in order to house the toothed belt so as to be slidably in such a way that a toothed portion of the toothed belt formed at one surface of the toothed belt so as to extend in a moving direction thereof is facing the first wall portion, and a back surface formed at the other surface of the toothed belt is facing the second wall portion, wherein the housing further includes a holding portion integrally formed at the second wall portion so as to protrude toward the first wall portion in a length that is shorter than a distance between the first wall portion and the second wall portion so that the toothed belt is prevented from being moved out of the housing in the vehicle height direction by means of the holding portion, and an opening formed at the bottom portion along the first and second wall portions and opposes the holding portion, so as to open in a height direction of the vehicle.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
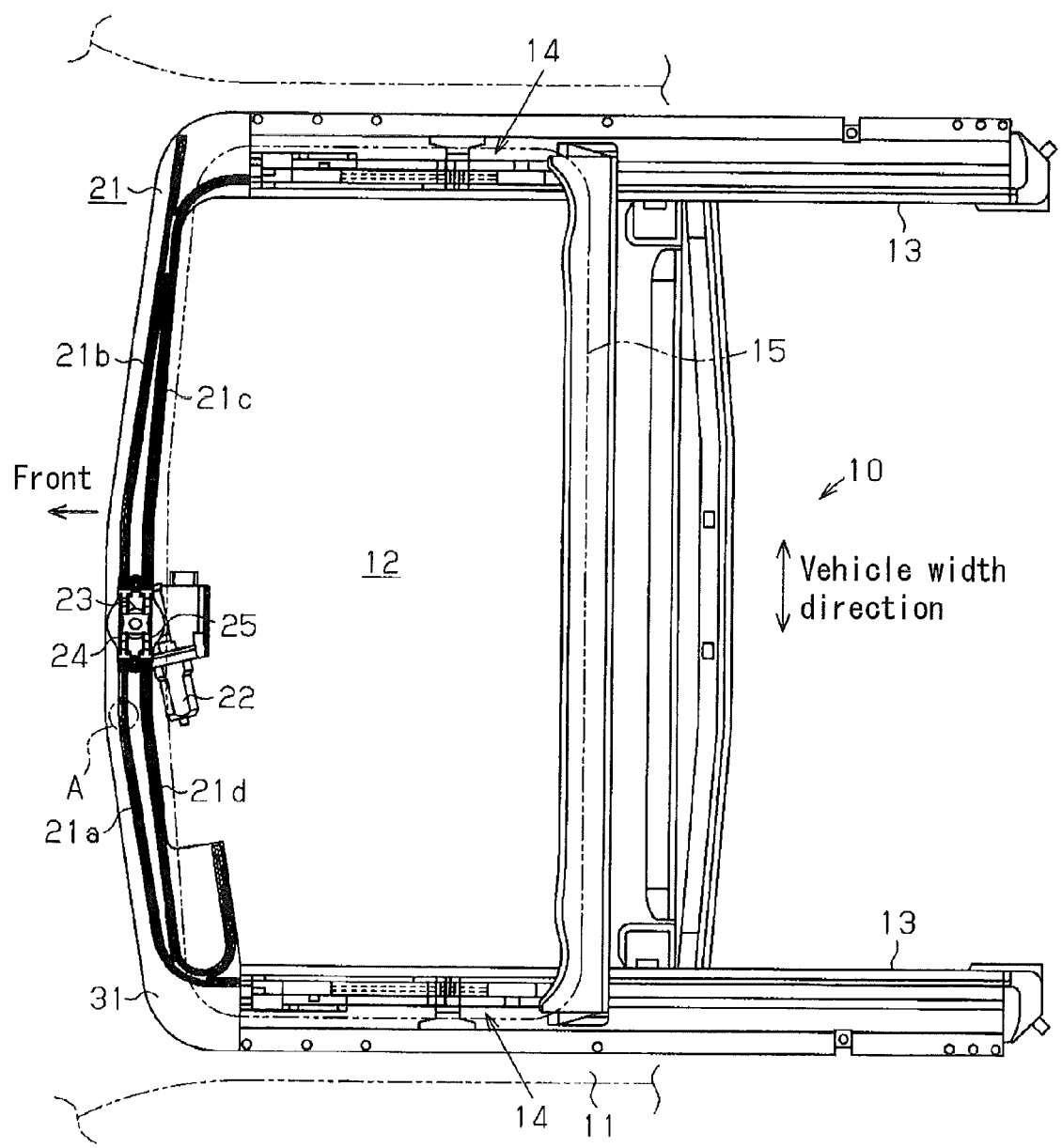
FIG. 1 illustrates a plain view indicating an embodiment related to the present invention.

An embodiment of the present invention will be explained in detail in accordance with the attached drawings. The drawing in FIG. 1 illustrates a plane view of a sunroof device 10 serving as a roof device for a vehicle to which a belt supporting apparatus for a vehicle roof in the embodiment is applied. As illustrated in FIG. 1, the sunroof device 10 is mounted to the vehicle at a roof 11 to which an opening portion 12, formed in a rectangular shape, is provided. The sunroof device includes a pair of guide rails 13 (e.g., first and second guide rails 13) arranged and fixed to sides of the opening portion 12, respectively, in a vehicle width direction (a width direction of the roof 11). In other words, the guide rails 13 are arranged so as to extend in a front-rear direction of the vehicle (a front-rear direction of the roof 11) in a manner where the first guide rail 13 is fixed to one side of the opening portion 12 in the vehicle width direction, and the second guide rail 13 is fixed to the other side of the opening portion 12 in the vehicle width direction. Each guide rail 13 is made of extruded material of aluminum base alloy and formed so as to have a constant cross section in a longitudinal direction thereof.

Operation mechanisms 14 (e.g., first and second operation mechanisms 14) are movably guided and supported by the guide rails 13, respectively. Specifically, the first operation mechanism 14 is supported by the first guide rail 13, and the second operation mechanism 14 is supported by the second guide rail 13. Further, the movable panel 15, made of a glass plate and formed in a rectangular shape, is arranged at the roof 11 and positioned between the first and second operation mechanism 14. Specifically, one side of the movable panel 15 in the vehicle width direction is supported by and fixed at the first operation mechanism 14, and the other side of the movable panel 15 in the vehicle width direction is supported by and fixed at the second operation mechanism 14, in such a way that the first operation mechanism 14 is connected to the second operation mechanism 14 by means of the movable panel 15. In connection with the guide rails 13, the movable panel 15 is actuated so as to move, tilt up or down by means of the operation mechanisms 14 sliding on the guide rails 13. Accordingly, the opening portion 12 of the roof 11 is closed or exposed to the outside in accordance with the movement of the movable panel 15. Specifically, in connection with the guide rail 13, the operation mechanisms 14 control a posture of the movable panel 15 when the opening portion 12 is closed or exposed to the outside.

The sunroof device 10 further includes a front housing 21 (e.g., a housing) made of resin and arranged so as to extend in the vehicle width direction for connecting a front end of the first guide rail 13 to a front end of the second guide rail 13. The front housing 21, serving as a housing, houses a driving gear 23 at a central portion of the front housing 21 in a longitudinal direction thereof. The driving gear 23 includes a spur gear rotated by an electric motor 22, serving as a power source. The driving gear 23 is supported by the front housing 21 so as to be rotatable relative to a rotational axis extending in a height direction of the vehicle.

The front housing 21 includes guiding grooves 21a, 21b, 21c and 21d. The guiding groove 21a (e.g., a first guiding groove) is formed in such a way that it extends from the longitudinally central portion of the front housing 21, at which the driving gear 23 is positioned, in one direction of the vehicle width (downwardly in FIG. 1) along a shape of a front end portion of the front housing 21, and the guiding groove 21a is bent in the vicinity of one end (a lower end in FIG. 1) of the front housing 21 and further extends towards the rear of the vehicle. An end of the guiding groove 21a is connected to the first guide rail 13. The guiding groove 21b (e.g., a second guiding groove) is formed in such a way that it extends from the longitudinally central portion of the front housing 21, at which the driving gear 23 is positioned, in the other direction of the vehicle width (upwardly in FIG. 1) along the shape of the front end portion of the front housing 21. The guiding groove 21c (e.g., a third guiding groove) is formed in such a way that it extends from the longitudinally central portion of the front housing 21, at which the driving gear 23 is positioned, in the other direction of the vehicle width (upwardly in FIG. 1) along a shape of a rear end portion of the front housing 21, and the guiding groove 21c is bent in the vicinity of the other end (an upper end in FIG. 1) of the front housing 21 and further extends towards a rear of the vehicle. An end of the guiding groove 21a is connected to the second guide rail 13. The guiding groove 21d (e.g., a fourth guiding groove) is formed in such a way that it extends from the longitudinally central portion of the front housing 21, at which the driving gear 23 is positioned, in one direction of the vehicle width (downwardly in FIG. 1) along the shape of the rear end portion of the front housing 21, and the guiding groove 21d makes a curve having a relatively small radius, for example a hairpin curve, in the vicinity of the one end (the lower end in FIG. 1) of the front housing 21. Each of the guiding grooves 21a, 21b, 21c and 21d includes a U-shaped cross section that opens upwardly. A total length of the guiding grooves 21a and 21b is set to be approximately equal to a total length of the guiding grooves 21c and 21d.

The guiding grooves 21a and 21b house a toothed belt 24 so as to be movable and mesh with the driving gear 23 at a front portion thereof. The toothed belt 24 is made of resin and formed so as to have a rack gear. The guiding grooves 21c and 21d also house a toothed belt 25 so as to be movable and mesh with the driving gear 23 at a rear portion thereof. The toothed belt 25 is also made of resin and is formed so as to have a rack gear. The toothed belt 24 is moved so as to be guided by the guiding grooves 21a and 21b so that a moving path of the toothed belt 24 is regulated by the guiding grooves 21a and 21b. The toothed belt 25 is moved so as to be guided by the guiding grooves 21c and 21d so that a moving path of the toothed belt 25 is regulated by the guiding grooves 21c and 21d. Accordingly, without being deflected to an unexpected level, the toothed belts 24 and 25 are moved in order to transmit driving forces to the operation mechanisms 14. In order to maintain a strength of each of the toothed belts 24 and 25 to a certain level, a metal wire W is embedded within each of the toothed belts 24 and 25 in such a way that a central line of the metal wire W extends in a longitudinal direction of each of the toothed belts 24 and 25.

On end portion of the toothed belt 24 arranged so as to enter the first guide rail 13 along the guiding groove 21a is connected to the first operation mechanism 14 supported by the first guide rail 13. One end portion of the toothed belt 25 arranged so as to enter the second guide rail 13 along the guiding groove 21c is connected to the second operation mechanism 14 supported by the second guide rail 13.

In this configuration, in a case where the driving gear 23 is rotated in an anticlockwise direction in FIG. 1 by a drive of the electric motor 22, the toothed belts 24 and 25 are moved along the guiding grooves 21a and 21c, respectively, in such a way that one end of the toothed belt 24 connected to the first operation mechanism 14 further enters the first guide rail 13, and one end of the toothed belt 25 connected to the second operation mechanism 14 further enters the second guide rail 13, accordingly the first and second operation mechanisms 14 are moved towards the rear of the vehicle along the first and second guide rails 13, respectively. At this point, the toothed belts 24 and 25 are moved in such a way that the other ends of the toothed belts 24 and 25, which are so called free ends, are moved in a direction where the free ends are supposed to be moved out of the guiding grooves 21b and 21d, respectively.

On the other hand, in a case where the driving gear 23 is rotated in a clockwise direction in FIG. 1 by the drive of the electric motor 22, the toothed belts 24 and 25 are moved along the guiding grooves 21a and 21c, respectively, in such a way that one end of the toothed belt 24 connected to the first operation mechanism 14 is supposed to be pulled out from the first guide rail 13, and one end of the toothed belt 25 connected to the second operation mechanism 14 is supposed to be pulled out from the second guide rail 13, accordingly the first and second operation mechanisms 14 are moved towards the front of the vehicle along the first and second guide rails 13, respectively. At this point, the toothed belts 24 and 25 are moved in such a way that the free ends of the toothed belts 24 and 25 are moved in a direction where the free ends further enter the guiding grooves 21b and 21d, respectively.

As mentioned above, because the one end portions of the toothed belts 24 and 25 connected to the first and second operation mechanisms 14, respectively, are moved in the same direction when the electric motor 22 is driven, a length of a part of the toothed belt 24, which may enter the first guide rail 13, is set so as to be identical to a length of a part of the toothed belt 25, which may enter the second guide rail 13. Accordingly, a synchronization between the operation mechanisms 14 may be achieved by the toothed belts 24 and 25 actuated by the drive of the electric motor 22. In accordance with the front-rear movement of the operation mechanism 14, the movable panel 15 is operated so as to be moved, tilted-up or tilted-down.

Figure 2A:
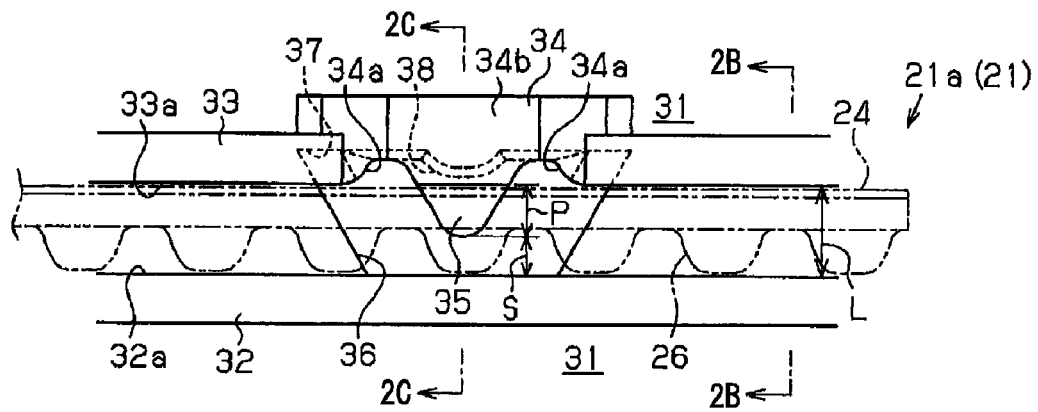
FIG. 2A illustrates a enlarged diagram indicating a range A in FIG. 1.
Figure 2B:
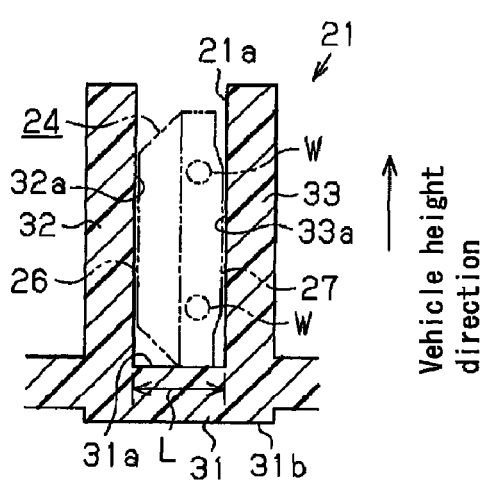
FIG. 2B illustrates a cross section along a line 2B-2B in FIG. 2A.
Figure 2C:
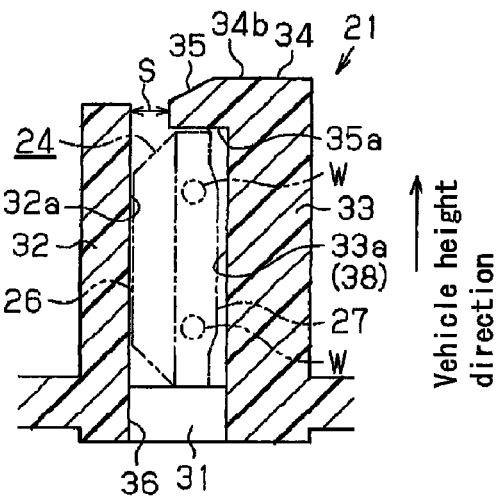
FIG. 2C illustrates a cross section along a line 2C-2C in FIG. 2A.
Figure 2D:
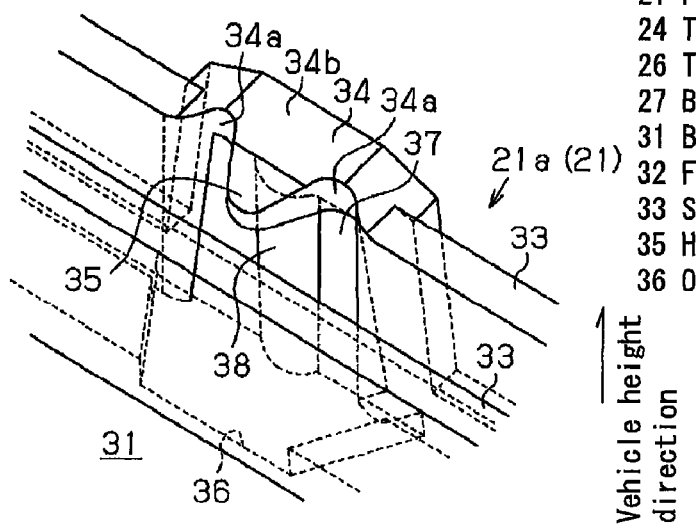
FIG. 2D illustrates an oblique perspective view of the front housing illustrated in FIG. 2A.

The supporting structure of the toothed belt 24 by the guiding groove 21a (front housing 21) will be further explained in detail in accordance with the drawings of FIGS. 2A through 2D. FIG. 2A illustrates an enlarged diagram indicating a range A in FIG. 1, FIG. 2B illustrates a cross section along a line 2B-2B in FIG. 2A, FIG. 2C illustrates a cross section along a line 2C-2C in FIG. 2A, and FIG. 2D illustrates an oblique perspective view of the front housing 21 illustrated in FIG. 2A.

As illustrated in the drawings of FIGS. 2A and 2B, the front housing 21 integrally includes a flat plate shaped bottom portion 31, and flat plate shaped first and second wall portions 32 and 33. The bottom portion 31 is formed so as to extend within an approximate entire length of the front housing in the flat view, and the first and second wall portions 32 and 33 are arranged so as to be vertical to the bottom portion 31 standing in the height direction of the vehicle. The first and second wall portions 32 and 33 are arranged so as to be parallel to each other. The guiding groove 21a, formed so as to have the U-shaped cross section, is defined by an inner bottom surface 31a of the bottom portion 31, a first inner surface 32a of the first wall portion 32 and a second inner surface 33a of the second wall portion 33. Specifically, the inner bottom surface 31a is facing the first and second wall portions 32 and 33, the first inner surface 32a is facing the second wall portion 33, and the second inner surface 33a is facing the first wall portion 32.

The toothed belt 24 housed within the guiding groove 21a in such a way that a toothed portion 26 formed at the toothed belt 24 on one surface thereof so as to continue in a longitudinal direction thereof is facing the first wall portion 32 (the first inner surface 32a), and a back surface 27 formed on the other surface thereof is facing the second wall portion 33 (the second inner surface 33a). A thickness of the toothed belt 24 is set so as to be slightly smaller than a distance L between the first and second wall portions 32 and 33, so that the toothed belt 24 is moved in such a way that the toothed portion 26 is sliding on the first wall portion 32 (first inner surface 32a), and the back surface 27 is sliding on the second wall portion 33 (second inner surface 33a).

As indicated in the drawing of FIG. 2D, at the top portion of the second wall portion 33, a protruding portion 34 is integrally formed so as to extend upwardly and to be formed in an approximate trapezoidal shape. As indicated in the drawings of FIGS. 2A and 2C, a holding portion 35 is integrally formed at the protruding portion 34 at a central portion thereof, specifically, at a central portion in a longitudinal direction of the second wall portion 33, the direction corresponding to the moving direction of the toothed belt 24. More specifically, the holding portion 35 is formed so as to extend from the protruding portion 34 of the second wall portion 33 toward the first wall portion 32 at a protruding length P, which is shorter than the distance L between the first and second wall portions 32 and 33. The protruding length P may also be refereed to as a length of a portion of the holding portion 35 exposed to the guiding groove 21a. The holding portion 35 is formed in a so called a cantilever structure, setting the protruding portion 34 as a base. The holding portion 35 includes an inner surface 35a formed so as to face the toothed belt 24 and be arranged in the vicinity of an upper surface of the toothed belt 24. Thus, the holding portion 35 functions as a stopping portion, by which the toothed belt 24 is prevented from being moved out of the guiding groove 21a in the vehicle height direction. A clearance S (=L−P) is set between the holding portion 35 and the first wall portion 32 (first inner surface 32a), which is a difference between the distance L and the protruding length P. The clearance S is set so as to be smaller than a thickness of the toothed belt 24.

On both sides of the holding portion 35 of the protruding portion 34 in a longitudinal direction of the second wall portion 33 corresponding to the moving direction of the toothed belt 24, a recessed portion 34a is formed so as to be distant from the first wall portion 32.

An opening 36 is formed on the bottom portion 31 at a portion corresponding to the position at which the holding portion 35 is formed, along the first and second wall portions 32 and 33. The opening 36 is formed in a trapezoidal shape and in a size which corresponding to a total area of the holding portion 35 and the recessed portion 34a in its plain view. The opening 36 is formed in such a way that, when it is seen in a longitudinal direction of the front housing 21, an end portion of the opening 36 being close to the second wall portion 33 overlaps the second wall portion 33 at which the holding portion 35 is not formed. Approximately corresponding to the opening 36 in its plain view, A recessed portion 37 is formed on the inner surface 33a of the second wall portion 33 so as to extend from the inner surface 35a of the holding portion 35 to the opening 36 in the vehicle height direction and be recessed to be distant from the first wall portion 32. Further, on the inner surface 33a of the second wall portion 33, a protruding portion 38 is formed at a central portion in the recessed portion 37 (a central portion of the second wall portion 33 at which the holding portion 35 is formed, in a longitudinal direction thereof corresponding to the moving direction of the toothed belt 24). The protruding portion 38 is formed so as to protrude toward the first wall portion 32. Specifically, the protruding portion 38 protrudes in a thickness direction of the second wall portion 33 so as not to exceed the second inner surface 33a of the second wall portion 33 at which the holding portion 35 is not formed.

A plurality of the holding portions 35 and their surrounding structures indicated in the diagrams of FIGS. 2A through 2D are provided along the longitudinal direction of the guiding groove 21a with predetermined intervals. Because a structure of each of the guiding grooves 21b, 21c and 21d for supporting the toothed belts 24 and 25 are similar to the supporting structure of the guiding groove 21a, detailed explanations of the supporting structures of the guiding grooves 21b, 21c and 21 are omitted.

Figure 3A:
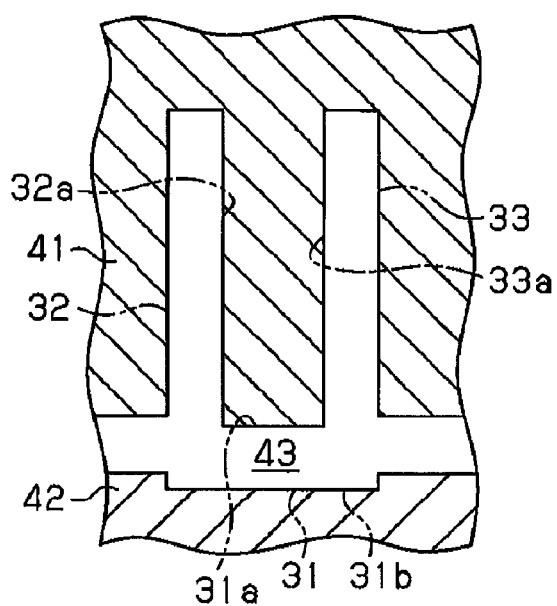
FIG. 3A illustrates a pattern diagram indicating a molding manner according to the embodiment.
Figure 3B:
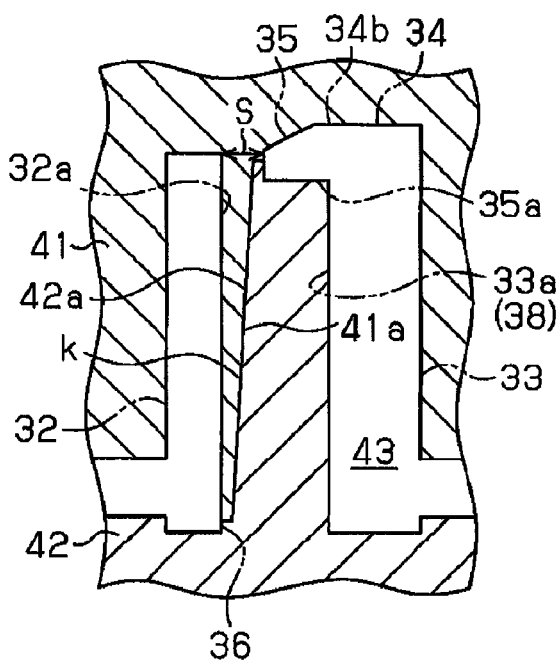
FIG. 3B illustrates a pattern diagram indicating the molding manner according to the embodiment.

A forming manner (e.g., molding) of the front housing 21 will be explained on the basis of the drawing of FIGS. 3A and 3B. The drawing of FIG. 3A illustrates a pattern diagram indicating a molding manner of the front housing 21 at a position corresponding to the diagram of FIG. 2B, especially indicating the guiding groove 21a, and the drawing of FIG. 3B illustrates a pattern diagram indicating the molding manner of the front housing 21 at a position corresponding to the diagram of FIG. 2C, especially indicating the guiding groove 21a. This molding manner may be applied to any of the guiding grooves 21a through 21d. As illustrated in the diagrams of FIGS. 3A and 3B, the front housing 21 is formed in such a way that a cavity 43 defined by a first mold 41 and a second mold 42 is filled with resin that is in a molten state. In the drawings, the cavity 43 is illustrated with the numerals used for indicating each corresponding portion of the guiding grooves 21a, 21b, 21c and 21d.

An opening direction of the first and second molds 41 and 42 corresponds to a standing direction of each of the first and second wall portions 32 and 33. As indicated in the drawing of FIG. 3A, at a position where the holding portion 35 is not formed, the first wall portion 32, the second wall portion 33 and the inner bottom surface 31a of the bottom portion 31 are formed by use of the first mold 41, and an outer surface 31b of the bottom portion 31 not facing the first and second wall portions 32 and 33 is formed by use of the second mold 42.

Further, as illustrated in the drawing of FIG. 3B, at a position where the holding portion 35 is formed, the first and second molds 41 and 42 are formed in such a way that a line K of a matching surface therebetween is set so as to extend from an end of the holding portion 35 facing the first wall portion 32 to the bottom portion 31 being close to a bottom of the first wall portion 32. Specifically, the first mold 41 includes an unguiformed protruding portion 41a formed so as to protrude downwardly in FIG. 3B having a thickness that corresponds to the clearance S between the holding portion 35 and the first wall portion 32. Further, the second mold 42 includes an unguiformed protruding portion 42a formed so as to protrude upwardly in FIG. 3B having a thickness that corresponds to the size of the opening 36 (e.g., a width of the opening 36 in a horizontal direction in FIG. 3B). According to the parting structure of the first and second molds 41 and 42, the second inner surface 33a (the recessed portion 37 and the protruding portion 38) and the inner surface 35a of the holding portion 35 connected to the second inner surface 33a are formed by use of the second mold 42, and the first inner surface 32a of the first wall portion 32 and the outer surface 34b of the protruding portion 34 including the holding portion 35 are formed by use of the first mold 41.

More specifically, an entire portion of the first inner surface 32a of the first wall portion 32, in other words a surface facing the toothed portion 26, is formed by use of the first mold 41 regardless of an existence of the holding portion 35. Accordingly, a parting line PL, which is a line of a protrusion formed so as to correspond to a matching surface between two molds, is not formed on the first inner surface 32a that faces the toothed portion 26, and noise may not occur due to an interference between the parting line PL and the toothed portion 26 when the toothed belt 24 is moved. The opening 36 of the bottom portion 31 is formed by the protruding portion 42a of the second mold 41 being used for forming the second inner surface 33a (the recessed portion 37 and the protruding portion 38) of the second wall portion 33 and the inner surface 35a of the holding portion 35.

At the position where the holding portion 35 is formed, the second inner surface 33a (the recessed portion 37 and the protruding portion 38) of the second wall portion 33 and the inner surface 35a of the holding portion 35 connected to the second inner surface 33a are formed by use of the second mold 42, while, at the position where the holding portion 35 is not formed, the second inner surface 33a is formed by the first mold 41. Accordingly, at the position where the holding portion 35 is formed, a parting line PL is formed on the second inner surface 33a of the second wall portion 33, in other words the parting line PL is formed on a surface facing the back surfaces 27 of the toothed belts 24 and 25. However, because the second wall portion 33 includes the recessed portion 37 at the position where the holding portion 35 is formed, the parting line PL may be compensated by the recessed portion 37 (e.g., compensated with a difference between the second inner surface 33a and a surface of the recessed portion 37), and an corner formed between an end surface of each of the toothed belts 24 and 25 and the back surface 27 may not interfere with the parting line PL, for example.

Further, because the second wall portion 33 includes a protruding portion 38 formed between the recessed portion 37 so as to protrude toward the first wall portion 32, in accordance with the movements of the toothed belts 24 and 25, even when the end portion of each of the toothed belts 24 and 25 enters one of the recessed portion 37, the end portion may be moved out of the recessed portion 37 by a guide of the protruding portion 38. Accordingly, the toothed belts 24 and 25 may be moved smoothly.

The toothed belts 24 and 25 are housed in the front housing 21 (within the guiding grooves 21a through 21d) in a manner where the toothed portion 26 of each of the toothed belts 24 and 25 faces the first wall portion 32, and the back surface 27 of each of the toothed belts 24 and 25 faces the second wall portion 33. Accordingly, the toothed belts 24 and 25 are prevented from being moved out of the guiding grooves 21a through 21d because of the holding portions 35. Thus, the moving path of the each of the toothed belts 24 and 25 are maintained by a single component such as the front housing 21, which results in a decrement of a parts number, a restraining of manufacturing time increase, and a cost reduction. Further, because the first and second wall portions 32 and 33 are formed in accordance with the moving path of each of the toothed belts 24 and 25, as long as they are formed at the front housing 21 (bottom portion 31), a level of flexibility of a setting of the moving path of each of the toothed belts 24 and 25 may be increased. Furthermore, because of the first and second wall portions 32 and 33 and the bottom portion 31, the rigidity of the front housing 21 may be relatively increased, accordingly a change of the moving path length of each of the toothed belts 24 and 25, which may be caused by a deformation, for example an expansion or a shrinkage of the first and second wall portions 32 and 33 (the guiding grooves 21a through 21d), may be reduced. Further, because there is no need to provide an additional straight portion at a connecting portion between the operation mechanisms 14 and the movable panel 15 in order to compensate the change of the moving path length, the connecting portion may be downsized.

More specifically, an entire portion of the first inner surface 32a of the first wall portion 32, in other words a surface facing the toothed portion, is formed by use of the first mold 41 regardless of an existence of the holding portion 35. Accordingly, the parting line PL is not formed on the first inner surface 32a that faces the toothed portion 26, and noise may not occur due to an interference between the parting line PL and the toothed portion 26 when the toothed belt 24 is moved.

Further, because the second wall portion 33 includes the recessed portion 37 at the position where the holding portion 35 is formed, the parting line PL may be compensated by the recessed portion 37 (e.g., compensated with a difference between the second inner surface 33a and a surface of the recessed portion 37), and an corner formed between an end surface of each of the toothed belts 24 and 25 and the back surface 27 may not interfere with the parting line PL, for example.

Furthermore, because the second wall portion 33 includes the protruding portion 38 formed between the recessed portion 37 so as to protrude toward the first wall portion 32, in accordance with the movements of the toothed belts 24 and 25, even when the end portion of each of the toothed belts 24 and 25 enters one of the recessed portion 37, the end portion may be out of the recessed portion 37 by a guide of the protruding portion 38. Accordingly, the toothed belts 24 and 25 may be moved smoothly.

Thus, because the drive of the electric motor 22 is transmitted by use of the toothed belts 24 and 25, each of which is formed so as to include an approximate vertical long-rectangular shaped cross section, a space of the front housing 21 (bottom portion 31) within which the toothed belts 24 and 25 are formed may be reduced compared to a case where a cable having a circular shaped cross section is used, and a level of flexibility of a setting of the moving path may further be increased. Further, the toothed belts 24 and 25, formed so as to include an approximate vertical long-rectangular shaped cross section, are set within the guiding grooves 21a, 21b, 21c and 21d so as not to rotate relative to an axial direction that is corresponding to a longitudinal direction of the toothed belts 24 and 25, and useless rotational force may not be applied to the first and second operation mechanisms 14 connected to the toothed belts 24 and 25, respectively, as a result, a posture of each of the operation mechanism 14 may be stabilized. Furthermore, the toothed belts 24 and 25 formed so as to include an approximate vertical long-rectangular shaped cross section may be connected by a simple connecting structure, for example connected by an insertion, to the first and second operation mechanisms 14, respectively.

Figure 4:
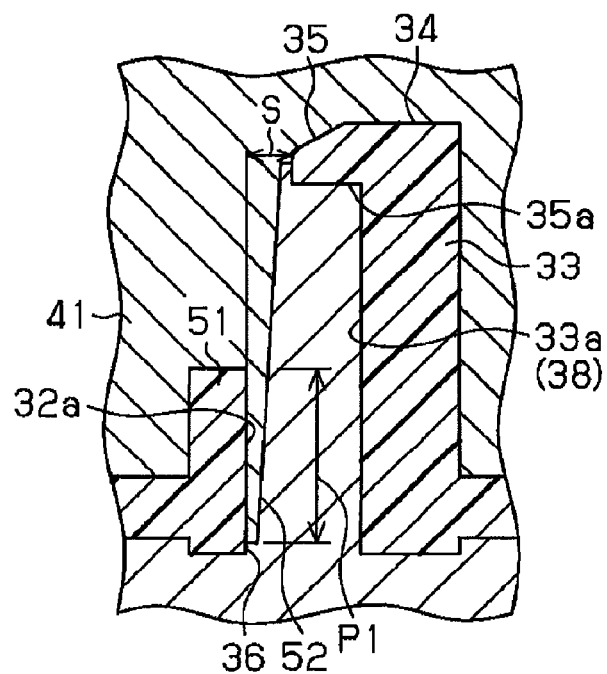
FIG. 4 illustrates a modified embodiment and a molding manner thereof related to the present invention.

The belt supporting apparatus for a vehicle roof and the roof device for vehicle described in the abovementioned embodiment may be modified as follows. As indicated in the drawing of FIG. 4, a first wall portion 51 whose height is shorter than the second wall portion 33 may be formed at a position where the holding portion 35 is provided. In this configuration, the length of a protruding portion 52 of the first mold 41 used for forming the first inner surface 32a of the first wall portion 51 may be set to a protruding length P1, which corresponds to the height of the first wall portion 51. Accordingly, a level of strength of the first mold 41 (protruding portion 52) may be increased.

Further, ribs may be formed at the front housing 21 (bottom portion 31) in order to reinforce the guiding grooves 21 through 21d. Furthermore, the front housing 21 may be divided into two portions in a vehicle width direction at the position where the driving gear 23 is positioned. Moreover, the opening 36 may be formed in other shapes, for example a square shape.

According to the embodiment, a belt supporting apparatus for a vehicle roof made of resin and formed so as to support a driving gear rotated by a power source and a toothed belt meshing with the driving gear and connected to an operation mechanism provided at each side of a vehicle roof in a vehicle width direction, comprises a housing, which includes a bottom portion, a first wall portion integrally formed with the bottom portion so as to stand from the bottom portion in a vehicle height direction, a second wall portion integrally formed with the bottom portion so as to stand from the bottom portion in the vehicle height direction and be parallel to the first wall portion, a holding portion integrally formed at the second wall portion so as to protrude toward the first wall portion in a length that is shorter than a distance between the first wall portion and the second wall portion and an opening formed at the bottom portion along the first and second wall portions and opposes the holding portion, so as to open in a height direction of the vehicle, wherein the housing houses the toothed belt so as to be slidably in such a way that a toothed portion of the toothed belt, formed at one surface of the toothed belt so as to extend in a moving direction thereof, is facing the first wall portion, and a back surface formed at the other surface of the toothed belt is facing the second wall portion, and the toothed belt is prevented from being moved out of the housing in the vehicle height direction by means of the holding portion.

Thus, the toothed belts are housed in the front housing (within the guiding grooves) in a manner where the toothed portion of each of the toothed belts faces the first wall portion, and the back surface of each of the toothed belts faces the second wall portion. Accordingly, the toothed belts and are prevented from being moved out of the guiding grooves because of the holding portions. Thus, the moving path of the each of the toothed belts is maintained by a single component such as the front housing, which results in a decrement of a parts number and a restraining of manufacturing time increase. Further, because the first and second wall portions are formed in accordance with the moving path of each of the toothed belts, as long as they are formed at the front housing (bottom portion), a level of flexibility of a setting of the moving path of each of the toothed belts may be increased.

Further, at the position where the holding portion is not formed, the first and second wall portions and the inner surface of the bottom portion is formed by the first mold, and the outer surface of the bottom portion not facing the first and second wall portions is formed by use of the second mold. On the other hand, at the position where the holding portion is formed, the first mold includes an unguiformed protruding portion formed having a thickness that corresponding to the clearance between the holding portion and the first wall portion. Further, the second mold includes an unguiformed protruding portion formed having a thickness that corresponding to the size of the opening. According to the parting structure of the first and second molds, the second inner surface (the recessed portion and the protruding portion) and the inner surface of the holding portion connected to the second inner surface are formed by use of the second mold, and the first inner surface of the first wall portion and the outer surface of the protruding portion including the holding portion are formed by use of the first mold. More specifically, an entire portion of the first inner surface of the first wall portion, in other words a surface facing the toothed portion, is formed by use of the first mold, regardless of an existence of the holding portion. Accordingly, the parting line PL is not formed on the first inner surface that faces the toothed portion, and noise may not occur due to an interference between the parting line PL and the toothed portion when the toothed belt is moved.

According to the embodiment, the second wall portion includes a recessed portion being recessed so as to be distant from the first wall portion at a position where the holding portion is provided.

Thus, at the position where the holding portion is not formed, the second inner surface, which is facing the first wall portion, in other words facing the back surface of the toothed belt, is formed by the first mold. On the other hand, at the position where the holding portion is formed, the second inner surface is formed by use of the second mold. In this configuration, a parting line PL is formed on the surface of the second wall portion facing the back surface of the toothed belt, at the position there the holding portion may be formed. According to the structure in the embodiment, because the second wall portion includes the recessed portion at the position where the holding portion 35 formed, the parting line PL may be compensated by the recessed portion (e.g., compensated with a difference between the second inner surface and a surface of the recessed portion), and a corner formed between an end surface of each of the toothed belts and the back surface may not interfere with the parting line PL, for example.

According to the embodiment, the second wall portion includes a protruding portion formed in the recessed portion and being protruding so as to be close to the first wall portion at a central portion of the second wall portion in a moving direction of the toothed belt.

In accordance with the movements of the toothed belts, even when the end portion of each of the toothed belts enters one of the recessed portion, the end portion may be out of the recessed portion by a guide of the protruding portion. Accordingly, the toothed belts may be moved smoothly.

According to the embodiment, a height of the first wall portion is set so as to be shorter than a height of the second wall portion, at least at a portion where the holding portion is formed.

In this configuration, because the height of the first wall portion is set so as to be lower than that of the second wall portion, at at least the position where the holding portion is formed, the length of the protruding portion of the first mold used for forming the first inner surface of the first wall portion may be set to a protruding length, which corresponds to the height of the first wall portion. Accordingly, a level of strength of the first mold (protruding portion) may be increased.

According to the embodiment, a belt supporting apparatus for a vehicle roof made of resin and formed so as to support a driving gear rotated by a power source and a toothed belt meshing with the driving gear and connected to an operation mechanism provided at each side of a vehicle roof in a vehicle width direction, comprises a housing, which includes a bottom portion, a first wall portion integrally formed with the bottom portion so as to stand from the bottom portion in a vehicle height direction, a second wall portion integrally formed with the bottom portion so as to stand from the bottom portion in the vehicle height direction and be parallel to the first wall portion, the bottom portion and the first and second wall portions being formed in such a way that a cavity defined by a first mold and a second mold is filled with resin that is in a molten state, and a holding portion integrally formed at the second wall portion so as to protrude toward the first wall portion in a length that is shorter than a distance between the first wall portion and the second wall portion, wherein at a portion where the holding portion is not formed, the first wall portion, the second wall portion and one surface of the bottom portion facing the first and second wall portions are formed by use of the first mold, and the other surface of the bottom portion not facing the first and second wall portions is formed by use of the second mold, at a portion where the holding portion is formed, by a parting structure of the first and second molds, one surface of the second wall portion facing the first wall portion and one surface of the holding portion facing the bottom portion and connected to the one surface of the second wall portion are formed by use of the second mold, and one surface of the first wall portion facing the second wall portion and the other surface of the holding portion not facing the bottom portion are formed by use of the first mold, and the housing houses the toothed belt so as to be slidably in such a way that a toothed portion of the toothed belt, formed at one surface of the toothed belt so as to extend in a moving direction thereof, is facing the first wall portion, and a back surface formed at the other surface of the toothed belt is facing the second wall portion, and the toothed belt is prevented from being moved out of the housing in the vehicle height direction by means of the holding portion.

The toothed belts are housed in the front housing (within the guiding grooves) in a manner where the toothed portion of each of the toothed belts faces the first wall portion, and the back surface of each of the toothed belts faces the second wall portion. Accordingly, the toothed belts are prevented from being moved out of the guiding grooves because of the holding portions. Thus, the moving path of the each of the toothed belts are maintained by a single component such as the front housing, which results in a decrement of a parts number, a restraining of manufacturing time increase, and a cost reduction. Further, because the first and second wall portions are formed in accordance with the moving path of each of the toothed belts, as long as they are formed at the front housing (bottom portion), a level of flexibility of a setting of the moving path of each of the toothed belts may be increased.

At the position where the holding portion is not formed, the first and second wall portion and the inner surface of the bottom portion facing the first and second wall portions are formed by use of the first mold, and the outer surface of the bottom portion not facing the first and second wall portions are is by use of the second mold. On the other hand, at the position where the holding portion is formed, according to the parting structure of the first and second molds, the first inner surface of the first wall portion and the outer surface of the protruding portion including the holding portion are formed by use of the first mold, and the second inner surface (the recessed portion and the protruding portion) and the inner surface of the holding portion connected to the second inner surface are formed by use of the second mold. More specifically, an entire portion of the first inner surface of the first wall portion, in other words a surface facing the toothed portion, is formed by use of the first mold, regardless of an existence of the holding portion. Accordingly, the parting line PL is not formed on the first inner surface that faces the toothed portion, and noise may not occur due to an interference between the parting line PL and the toothed portion when the toothed belt is moved.

According to the embodiment, a roof device for a vehicle comprises a movable panel by which an opening portion of a roof of the vehicle is closed or exposed to the outside in accordance with the movement of the movable panel, two guide rails, one of the guide rails provided at one side of the opening portion in a vehicle width direction so as to extend in a front-rear direction of the vehicle, and the other of the guide rails provided at the other side of the opening portion in the vehicle width direction so as to extend in the front-rear direction of the vehicle, an operation mechanism guided by the guide rail and supporting the movable panel, a driving gear rotated by a power source, a toothed belt meshing with the driving gear and connected to an operation mechanism provided at each side of a vehicle roof in the vehicle width direction; and a housing including a bottom portion, a first wall portion integrally formed with the bottom portion so as to stand from the bottom portion in a vehicle height direction, and a second wall portion integrally formed with the bottom portion so as to stand from the bottom portion in the vehicle height direction and be parallel to the first wall portion, in order to house the toothed belt so as to be slidably in such a way that a toothed portion of the toothed belt formed at one surface of the toothed belt so as to extend in a moving direction thereof is facing the first wall portion, and a back surface formed at the other surface of the toothed belt is facing the second wall portion, wherein the housing further includes a holding portion integrally formed at the second wall portion so as to protrude toward the first wall portion in a length that is shorter than a distance between the first wall portion and the second wall portion so that the toothed belt is prevented from being moved out of the housing in the vehicle height direction by means of the holding portion, and an opening formed at the bottom portion along the first and second wall portions and opposes the holding portion, so as to open in a height direction of the vehicle.

According to such apparatus, a manufacturing hour may be decreased, and a level of flexibility of a moving path setting for a toothed belt may be increased may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A belt supporting apparatus for a vehicle roof made of resin and formed so as to support a driving gear rotated by a power source and a toothed belt meshing with the driving gear and connected to operation mechanisms each supported by a respective guide rail provided at each side of a roof opening in a vehicle width direction, comprising a housing configured to extend across a front of the roof opening and to connect a front end of one of the guide rails to a front end of the other guide rail, the housing including:
 a bottom portion;
 a first wall portion integrally formed with the bottom portion so as to stand from the bottom portion in a vehicle height direction;
 a second wall portion integrally formed with the bottom portion so as to stand from the bottom portion in the vehicle height direction and be parallel to the first wall portion;
 a holding portion integrally formed at the second wall portion so as to protrude toward the first wall portion in a length that is shorter than a distance between the first wall portion and the second wall portion, the holding portion extending over only a portion of a lengthwise extent of the housing so that a portion of the housing devoid of the holding portion extends on either side of the holding portion; and
 an opening formed at the bottom portion along the first and second wall portions and opposes the holding portion, so as to open in a height direction of the vehicle, wherein the housing houses the toothed belt so as to be slidably in such a way that a toothed portion of the toothed belt, formed at one surface of the toothed belt so as to extend in a moving direction thereof, is facing the first wall portion, and a back surface formed at the other surface of the toothed belt is facing the second wall portion, and the toothed belt is prevented from being moved out of the housing in the vehicle height direction by the holding portion.

2. The belt supporting apparatus for the vehicle roof according to claim 1, wherein the second wall portion includes a recessed portion being recessed so as to be distant from the first wall portion at a position where the holding portion is provided.

3. The belt supporting apparatus for the vehicle roof according to claim 2, wherein the second wall portion underlying the holding portion, includes a protruding portion the protruding portion being formed in the recessed portion and protruding so as to be close to the first wall portion at a central portion of the second wall portion in a moving direction of the toothed belt.

4. The belt supporting apparatus for the vehicle roof according to one of claim 1, wherein a height of the first wall portion is set so as to be shorter than a height of the second wall portion, at least at a portion where the holding portion is formed.

5. The belt supporting apparatus for the vehicle roof according to one of claim 2, wherein a height of the first wall portion is set so as to be shorter than a height of the second wall portion, at least at a portion where the holding portion is formed.

6. The belt supporting apparatus for the vehicle roof according to one of claim 3, wherein a height of the first wall portion is set so as to be shorter than a height of the second wall portion, at least at a portion where the holding portion is formed.

7. A belt supporting apparatus for a vehicle roof made of resin and formed so as to support a driving gear rotated by a power source and a toothed belt meshing with the driving gear and connected to operation mechanisms each supported by a respective guide rail provided at each side of a vehicle roof opening in a vehicle width direction, comprising a housing configured to extend across a front of the roof opening and to connect a front end of one of the guide rails to a front end of the other guide rail, the housing including:
   a bottom portion;
   a first wall portion integrally formed with the bottom portion so as to stand from the bottom portion in a vehicle height direction;
   a second wall portion integrally formed with the bottom portion so as to stand from the bottom portion in the vehicle height direction and be parallel to the first wall portion;
   the bottom portion and the first and second wall portions being formed in such a way that a cavity defined by a first mold and a second mold is filled with resin that is in a molten state, and
   a holding portion integrally formed at the second wall portion so as to protrude toward the first wall portion in a length that is shorter than a distance between the first wall portion and the second wall portion, the holding portion extending over only a portion of a lengthwise extent of the housing so that a portion of the housing devoid of the holding portion extends on ether side of the holding portion; wherein
   at a portion where the holding portion is not formed, the first wall portion, the second wall portion and one surface of the bottom portion facing the first and second wall portions are formed by use of the first mold, and the other surface of the bottom portion not facing the first and second wall portions is formed by use of the second mold,
   at a portion where the holding portion is formed, by a parting structure of the first and second molds, one surface of the second wall portion facing the first wall portion and one surface of the holding portion facing the bottom portion and connected to the one surface of the second wall portion are formed by use of the second mold, and one surface of the first wall portion facing the second wall portion and the other surface of the holding portion not facing the bottom portion are formed by use of the first mold, and
   the housing houses the toothed belt so as to be slidably in such a way that a toothed portion of the toothed belt, formed at one surface of the toothed belt so as to extend in a moving direction thereof, is facing the first wall portion, and a back surface formed at the other surface of the toothed belt is facing the second wall portion, and the toothed belt is prevented from being moved out of the housing in the vehicle height direction by the holding portion.

8. A roof device for a vehicle comprising:
   a movable panel by which an opening portion of a roof of the vehicle is closed or exposed to the outside in accordance with the movement of the movable panel;
   two guide rails, one of the guide rails provided at one side of the opening portion in a vehicle width direction so as to extend in a front-rear direction of the vehicle, and the other of the guide rails provided at the other side of the opening portion in the vehicle width direction so as to extend in the front-rear direction of the vehicle;
   a driving gear rotated by a power source;
   a toothed belt meshing with the driving gear and connected to an operation mechanism provided at each side of a vehicle roof in the vehicle width direction, each operation mechanism being guided by one of the two guide rails; and
   a housing provided at a front of the opening portion of the roof, the housing being connected to a front end of the one guide rail and a front end of the other guide rail, the housing including a bottom portion, a first wall portion integrally formed with the bottom portion so as to stand from the bottom portion in a vehicle height direction, and a second wall portion integrally formed with the bottom portion so as to stand from the bottom portion in the vehicle height direction and be parallel to the first wall portion, in order to house the toothed belt so as to be slidably in such a way that a toothed portion of the toothed belt formed at one surface of the toothed belt so as to extend in a moving direction thereof is facing the first wall portion, and a back surface formed at the other surface of the toothed belt is facing the second wall portion,
   wherein the housing further includes
   a holding portion integrally formed at the second wall portion so as to protrude toward the first wall portion in a length that is shorter than a distance between the first wall portion and the second wall portion so that the toothed belt is prevented from being moved out of the housing in the vehicle height direction by means of the holding portion, the holding portion extending over only a portion of a lengthwise extent of the housing so that a portion of the housing devoid of the holding portion extends on ether side of the holding portion, and
   an opening formed at the bottom portion along the first and second wall portions and opposes the holding portion, so as to open in a height direction of the vehicle.

9. A belt supporting apparatus for a vehicle roof carried by first and second operation mechanisms provided at opposite sides in a vehicle width direction and carrying the vehicle roof, the belt supporting apparatus comprising:
   a housing supporting a driving gear driven by a power source;
   a first toothed belt possessing opposite ends, one end of the first toothed belt being connected to the first operation mechanism;
   a second toothed belt possessing opposite ends, one end of the second toothed belt being connected to the second operation mechanism;
   a common driving gear between the first toothed belt and the second toothed belt, the common driving gear being in meshing engagement with the first toothed belt and the second toothed belt, the common driving gear causing, when operated by a power source, the first toothed belt and the second toothed belt to move in opposite directions in push-pull fashion;

the housing including
- a bottom portion;
- a first wall portion integrally formed with the bottom portion so as to stand from the bottom portion in a vehicle height direction;
- a second wall portion integrally formed with the bottom portion so as to stand from the bottom portion in the vehicle height direction and be parallel to the first wall portion;
- a holding portion integrally formed at the second wall portion and protruding toward the first wall portion over a length shorter than a distance between the first wall portion and the second wall portion; and
- an opening at the bottom portion along the first and second wall portions and opposing the holding portion so as to open in a height direction of the vehicle;
- wherein the housing houses each of the first toothed belt and the second toothed belt in a manner permitting the first toothed belt and the second toothed belt to slide in the housing.

10. The belt supporting apparatus for the vehicle roof according to claim 9, wherein the second wall portion includes a recessed portion which is recessed so that the recessed portion is more distant from the first wall portion than portions of the second wall portion immediately adjacent the recessed portion, the recessed portion being located at a position where the holding portion is located.

11. The belt supporting apparatus for the vehicle roof according to claim 10, wherein the second wall portion includes a protruding portion underlying the holding portion, the protruding portion being positioned in the recessed portion and protruding in a direction towards the first wall portion at a central portion of the second wall portion relative to opposite ends of the second wall.

12. The belt supporting apparatus for the vehicle roof according to claim 9, wherein the first wall portion possesses a height shorter than a height of the second wall portion, at least at a part of the second wall portion at which the holding portion is located.

13. The belt supporting apparatus for the vehicle roof according to claim 10, wherein the first wall portion possesses a height shorter than a height of the second wall portion, at least at a part of the second wall portion at which the holding portion is located.

14. The belt supporting apparatus for the vehicle roof according to claim 11, wherein the first wall portion possesses a height shorter than a height of the second wall portion, at least at a part of the second wall portion at which the holding portion is located.

* * * * *